(12) United States Patent
Bao et al.

(10) Patent No.: US 11,609,473 B2
(45) Date of Patent: Mar. 21, 2023

(54) DISPLAY PLASMA MODULE AND MANUFACTURING METHOD THEREOF

(71) Applicant: WUXI VISION PEAK TECHNOLOGY CO., LTD, Wuxi (CN)

(72) Inventors: Jin Bao, Wuxi (CN); Lei Zhang, Wuxi (CN); Shan Chen, Wuxi (CN)

(73) Assignee: WUXI VISION PEAK TECHNOLOGY CO., LTD., Wuxi (CN)

( * ) Notice: Subject to any disclaimer, the term of this patent is extended or adjusted under 35 U.S.C. 154(b) by 938 days.

(21) Appl. No.: 16/335,262

(22) PCT Filed: Feb. 2, 2018

(86) PCT No.: PCT/CN2018/075034
§ 371 (c)(1),
(2) Date: Mar. 21, 2019

(87) PCT Pub. No.: WO2019/140717
PCT Pub. Date: Jul. 25, 2019

(65) Prior Publication Data
US 2021/0325757 A1    Oct. 21, 2021

(30) Foreign Application Priority Data

Jan. 19, 2018   (CN) .......................... 201810054139.2

(51) Int. Cl.
*G02F 1/1676*   (2019.01)
*G02F 1/167*    (2019.01)
(Continued)

(52) U.S. Cl.
CPC .......... *G02F 1/1679* (2019.01); *G02F 1/1341* (2013.01); *G02F 1/13439* (2013.01); *G02F 1/167* (2013.01); *G02F 1/1676* (2019.01)

(58) Field of Classification Search
CPC .... G02F 1/167; G02F 1/1679; G02F 1/16757; G02F 1/1345; G02F 1/16756;
(Continued)

(56) References Cited

U.S. PATENT DOCUMENTS

2006/0181751 A1    8/2006  Song et al.
2011/0304903 A1*  12/2011  Jun .......................... G02F 1/167
                                                            445/24

(Continued)

FOREIGN PATENT DOCUMENTS

CN     107357109     * 11/2017   .......... G02F 1/1679
CN     107357109 A    11/2017
(Continued)

*Primary Examiner* — Brandi N Thomas
(74) *Attorney, Agent, or Firm* — Bayramoglu Law Offices LLC

(57) ABSTRACT

The present invention belongs to the field of electronic display technology, and relates to a display plasma module and a manufacturing method thereof, characterized in that a display plasma module includes a pixel electrode and a transparent electrode located above the pixel electrode, characterized in that a display plasma is provided between the pixel electrode and the transparent electrode, and a spacer frame is located around the display plasma. In the present invention, the display plasma is used to replace the existing micro-cup structure or microcapsule. Compared to the traditional electrophoretic display screen with microstructure, the thickness is reduced, the contrast is increased by more than 10%, and the response time is reduced to less than 80 milliseconds, so that the manufacturing process is simpler, the yield is improved, and the manufacturing cost is reduced.

13 Claims, 1 Drawing Sheet

(51) Int. Cl.
  *G02F 1/1679* (2019.01)
  *G02F 1/1341* (2006.01)
  *G02F 1/1343* (2006.01)

(58) Field of Classification Search
  CPC .... G02F 1/1676; G02F 1/1681; G02F 1/1675;
    G02F 1/16766; G02F 1/1677; G02F
    1/1685; G02F 2001/1678; G02F 1/1362;
    G02F 1/136227; G02F 1/136286; G02F
    1/1368; G02F 2201/42; G02F 2202/16;
    G02F 1/133305; G02F 1/133374; G02F
    1/13338; G02F 1/1334; G02F 1/133514;
    G02F 1/1339; G02F 1/1343; G02F
    1/13629; G02F 2202/28; G02F 1/13312;
    G02F 1/133368; G02F 1/133388; G02F
    1/133394; G02F 1/133509; G02F
    1/133516; G02F 1/13394; G02F
    1/134336; G02F 1/134363; G02F
    1/13452; G02F 1/13613; G02F 1/136213;
    G02F 1/1365; G02F 1/1523; G02F
    1/1524; G02F 1/16755; G02F 1/23; G02F
    2201/086; G02F 2201/121; G02F
    2201/124; G02F 2201/54; G02F
    2202/046; G02F 2202/10; G02F 2203/01;
    G02F 2203/68; G09G 2330/021; G09G
    2310/0267; G09G 3/20; G09G
    2300/0408; G09G 2300/0417; G09G
    3/3266; G09G 3/3677; G09G 2310/0286;
    G09G 3/3208; G09G 3/36; G09G 3/344;
    G09G 2300/043; G09G 2320/0252; G09G
    2330/08; G09G 3/006; G09G 3/34; G09G
    2300/0426; G09G 2300/08; G09G
    2310/0213; G09G 2310/0245; G09G
    2310/0283; G09G 2320/0271; G09G
    2380/14; G09G 2300/026; G09G
    2300/0434; G09G 2300/0809; G09G
    2300/0819; G09G 2300/0857; G09G
    2310/027; G09G 2310/0275; G09G
    2310/068; G09G 2320/0209; G09G
    2330/06; G09G 2380/06; G09G 3/03;
    G09G 3/035; G09G 3/2003; G09G
    3/2074; G09G 3/2088; G09G 3/3614;
    G09G 3/3655; H01L 27/1225; H01L
    29/66757; H01L 2924/0002; H01L
    33/0095; H01L 21/02532; H01L
    21/02628; H01L 21/67173; H01L
    27/1292; H01L 27/1214; H01L 27/3244;
    H01L 21/02675; H01L 21/288; H01L
    21/6715; H01L 21/67207; H01L
    21/67236; H01L 21/76838; H01L
    21/76877; H01L 21/3221; H01L
    21/76251; H01L 2227/323; H01L
    2227/326; H01L 2251/5338; H01L
    27/124; H01L 27/1266; H01L 27/1288;
    H01L 27/3246; H01L 27/3248; H01L
    27/3258; H01L 29/24; H01L 29/42356;
    H01L 29/6675; H01L 29/786; H01L
    29/78606; H01L 29/78663; H01L
    29/7869; H01L 2924/00; H01L 51/003;
    H01L 51/0097; H01L 51/5237; H01L
    51/5246; H01L 51/529; H01L 51/56
  See application file for complete search history.

(56) References Cited

U.S. PATENT DOCUMENTS

| | | | |
|---|---|---|---|
| 2012/0156436 A1* | 6/2012 | Kim | C09K 11/88 428/172 |
| 2013/0077018 A1* | 3/2013 | Kuniyoshi | G02F 1/13338 349/58 |
| 2015/0118494 A1* | 4/2015 | Vilner | C09C 1/3684 524/576 |
| 2015/0305713 A1* | 10/2015 | Kim | B06B 1/0629 600/459 |

FOREIGN PATENT DOCUMENTS

| | | |
|---|---|---|
| EP | 2221661 A2 | 8/2010 |
| EP | 3521917 A1 | 8/2019 |
| KR | 101214334 * | 12/2012 |

\* cited by examiner

DISPLAY PLASMA MODULE AND MANUFACTURING METHOD THEREOF

CROSS REFERENCE TO THE RELATED APPLICATIONS

This application is the national phase entry of International Application No. PCT/CN2018/075034, filed on Feb. 2, 2018, which is based upon and claims priority to Chinese Patent Application No. 201810054139.2, filed on Jan. 19, 2018, the entire contents of which are incorporated herein by reference.

TECHNICAL FIELD

The present invention relates to a display plasma module and a manufacturing method thereof, which belong to the technical field of electronic display.

BACKGROUND

The electrophoresis display uses the phoresis phenomenon of the charged colloidal particles under the action of an electric field to display the images and words by driving the electrophoretic particles with different photoelectric properties by the electric field. Compared with the display technique in the prior art, the electrophoretic display has the following characteristics: flexible and easy to bend, light, thin, high contrast, low energy consumption, large visual angle, readable under sunlight, image bistable state, and easy mass production etc.

Electrophoretic display technique was first proposed in the 1970s. The U.S. Pat. No. 3,892,568 discloses a process of preparing an electrophoretic display material containing at least one type of electrophoretic particles. The patent NO. JP1086116 discloses an electrophoretic display system containing at least one type of electrophoretic particles and the electrophoretic liquid is encapsulated with microcapsules. The U.S. Pat. No. 6,930,818 discloses an electrophoretic display unit with the electrophoretic liquid encapsulated with a micro-cup. The patents NO. U.S. Pat. Nos. 5,930,026, 5,961,804, 6,017,584, and 6,120,588 disclose a microencapsulated electrophoretic display unit, wherein the display plasma includes two or more types of electrophoretic particles having different photoelectric properties. Taking a panoramic view of the prior art, the micro-cup electronic ink display screen and the microcapsule electronic ink display screen are both based on tiny cavity structures, namely, micro-cups and microcapsules. These two types of microstructures play a role of dispersedly encapsulating the display plasma.

Although the display screens with these two kinds of structures have been used in actual products, they have the following deficiencies.

1) The microcapsules and the micro-cups themselves have no display function, and are mainly made of transparent materials having a poor covering power. Moreover, a large amount of these materials is used in the entire electrophoretic display system, which lowers the covering power of the entire display screen, the contrast, the resolution, and the service life.

2) There is no doubt that the use of the microcapsules and micro-cup structures will increase the thickness of the entire electrophoretic display material layer, thereby causing lowered contrast and resolution of the display screen, slower response speed, increased driving voltage, slower refresh speed, increased power consumption, and narrowed operating temperature range.

3) The processes of preparing the microcapsules and micro-cups are too complicated, which raises difficulty and waste in manufacturing, reduced yield, materials waste, and high manufacturing cost.

SUMMARY

The objective of the present invention is to provide a display plasma module and a manufacturing method thereof to solve the problems in the application of the electronic display screen in the prior art, which can directly replace the existing micro-cup structure or microcapsule with the display plasma. Compared with the traditional electrophoretic display with a microstructure, the present invention is thinner, has a contrast increased by more than 10%, and a response time reduced to less than 80 milliseconds. Furthermore, the manufacturing process is simple, the yield is improved, and the manufacturing cost is reduced.

In order to achieve the above-mentioned technical objective, the technical solution of the present invention is as follows. A display plasma module includes a pixel electrode and a transparent electrode located above the pixel electrode, characterized in that a display plasma is provided between the pixel electrode and the transparent electrode; and a spacer frame is located around the display plasma.

Further, the display plasma and the pixel electrode, the spacer frame and the pixel electrode are adhered by a lightproof insulating adhesive layer.

Further, an electrically conductive layer is provided between the display plasma and the transparent electrode, an electrically conductive layer is also provided between the spacer frame and the transparent electrode; and a display area protection layer is provided between the spacer frame and the electrically conductive layer, a display area protection layer is also provided between an edge area of the display plasma and the electrically conductive layer.

Further, a material of the display area protection layer includes polyurethane, acrylic resin, epoxy resin or natural polymer.

Further, an integrated circuit (IC) module and a flexible circuit board are provided on one side of the spacer frame; the IC module and the flexible circuit board are adhered to the pixel electrode by an electrically conductive adhesive tape; the IC module, the flexible circuit board and the electrically conductive adhesive tape are fixed and sealed on the pixel electrode by an RTV silicone.

Further, the display plasma includes at least two kinds of electrophoretic particles having different photoelectric properties, and has a thickness of 2-300 microns.

Further, an electrophoretic fluid in the display plasma has a viscosity of 100-100000 cP.

Further, the spacer frame and the display plasma may include supporting microspheres; a material of the supporting microspheres includes resin microspheres and glass microspheres; and each of supporting microspheres has a diameter of 2-60 microns.

In order to achieve the above-mentioned technical objective, the present invention also provides a method for manufacturing a display plasma module, characterized in that the method includes the following steps:

step 1: placing a pixel electrode pre-printed with a lightproof insulating adhesive layer on an adhesive dispensing platform;

step 2: dropping a frame sealing adhesive on the pixel electrode by an adhesive dispenser to form a spacer frame;

step 3: printing a display plasma in the spacer frame by a silk-screen printing equipment;

step 4: coating a conductive silver paste in the spacer frame;

step 5: laminating a transparent electrode with an electrically conductive layer and a display area protection layer on the entire spacer frame, and performing a curing;

step 6: trimming off a part of the transparent electrode and the display area protection layer by a glass cutting machine to expose a predetermined position for binding an IC module on the pixel electrode;

step 7: configuring the IC module and a flexible circuit board on an edge of the pixel electrode by a Chip on Glass (COG) process;

step 8: fixing and sealing the IC module and the flexible circuit board in an RTV silicone by an RTV silicone printing process, to complete a manufacture of an electronic ink display screen.

Further, supporting microspheres may be pre-coated on a lightproof insulating adhesive layer on a surface of the pixel electrode.

Compared with the traditional electronic ink display screen, the present invention has the following advantages.

1) Compared with the traditional microstructure electrophoretic display screen, without involving the traditional micro-capsule or micro-cup in the display, the display effects will be affected. In the present invention, the micro-capsule or the micro-cup is replaced with the display plasma, so the display effects re better and the contrast is increased by more than 10%.

2) The display plasma of the present invention can reduce the thickness of the entire electrophoretic display layer, reduce the response time to less than 80 milliseconds, reduce the driving voltage to +1.5 V to +8V and −8V to −1.5V, and broaden the operating temperature range to −30-70° C. Meanwhile, the production cost is reduced.

3) The display area protection layer of the present invention protects the display plasma of the display area, and plays a role of lightproof and insulation;

4) The lightproof layer and the insulating adhesive layer of the present invention are used to protect the pixel electrode from optical radiation, isolate the display plasma and the pixel electrode, and prevent the display plasma from damaging the pixel electrode.

5) The processes of the present invention can be used to manufacture a large-scale display plasma module more than 100 inches.

Figure 1:
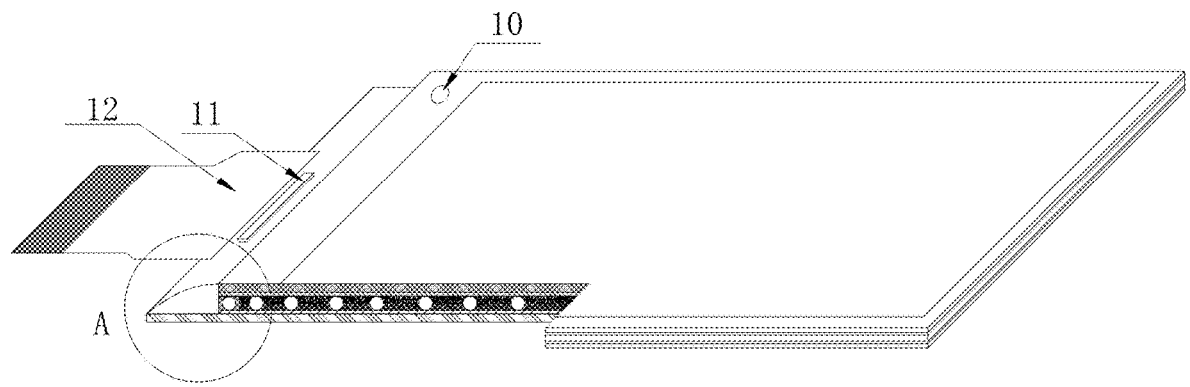
FIG. 1 is a top plan view showing a structure of an embodiment of the present invention.

The description of reference designators: 1: transparent electrode; 2: electrically conductive layer; 3: display plasma; 4: support microsphere; 5: lightproof insulating adhesive layer; 6: spacer frame; 7: pixel electrode; 8: display area protection layer; 9: RTV silicone; 10: conductive silver paste; 11: IC module; 12: flexible circuit board.

DETAILED DESCRIPTION OF THE EMBODIMENTS

The present invention will be further described hereinafter with reference to the specific drawings and embodiments.

The present invention is not limited to the following embodiments. The drawings being referred to in the following description are intended to illustrate the contents of the present invention. Namely, the present invention is not limited to the structure of the electronic ink display screen exemplified in the drawings.

Figure 2:
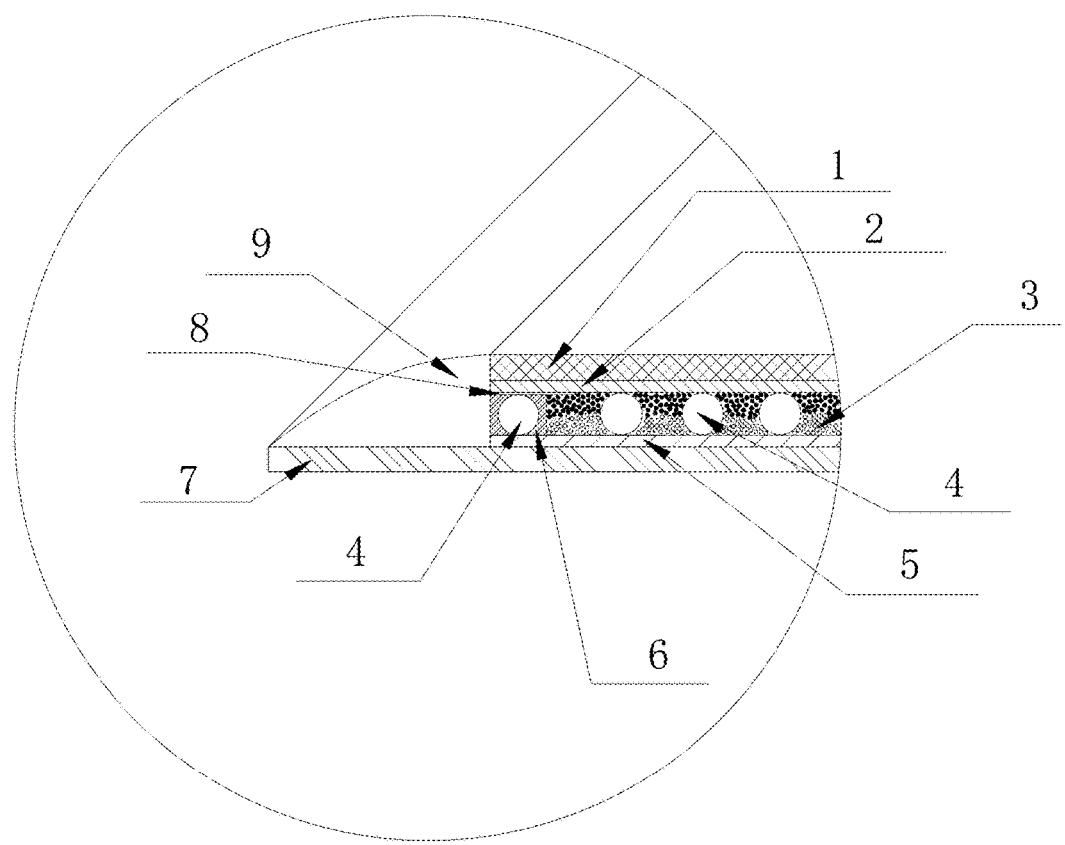
FIG. 2 is a cross-sectional view showing a portion A in FIG. 1.

As shown in FIG. 1 and FIG. 2, in this embodiment, a double-particle electronic ink display screen is taken as an example. A display plasma module includes a pixel electrode 7 and a transparent electrode 1 located above the pixel electrode 7, characterized in that a display plasma 3 is provided between the pixel electrode 7 and the transparent electrode 1, and a spacer frame 6 is located around the display plasma 3. The display plasma 3 includes a plurality of white particles and a plurality of black particles. The black particles and the white particles are driven by an IC module 11 to make the display screen display black and white color under different electric fields. The pixel electrode 7 may include a segment code and a dot matrix etc. The base material of the pixel electrode 7 may be glass and plastics. The plastic base material includes Polyimide (PI), Polyethylene Naphthalate (PEN), and Polyethylene Terephthalate (PET) etc.

The display plasma 3 and the pixel electrode 7 are adhered by a lightproof insulating adhesive layer 5, and the spacer frame 6 and the pixel electrode 7 are also adhered by the lightproof insulating adhesive layer 5. The material of the lightproof insulating adhesive layer 5 includes polyurethane, acrylic resin, epoxy resin and natural polymer etc. The adhesive may be water type, solvent type, hot melt type and photo curing type etc., preferably, the water type and the photo curing type, and is used to protect the pixel electrode 7 from optical radiation and affecting the performance and the service life of the display screen. Simultaneously, the display plasma 3 is separated from the pixel electrode 7, which prevents the display plasma 3 from damaging the pixel electrode 7.

An electrically conductive layer 2 is provided between the display plasma 3 and the transparent electrode 1, and the electrically conductive layer 2 is also provided between the spacer frame 6 and the transparent electrode 1. A display area protection layer 8 is provided between the spacer frame 6 and the electrically conductive layer 2. The electrically conductive layer 2 of the transparent electrode 1 may be Indium Tin Oxide (ITO), silver nanowires, graphene, and carbon nanotubes etc. The base material of the transparent electrode 1 includes glass, plastic, and glass or plastic with a protection layer. The plastic base material includes PI, PEN and PET etc. The protection layer is deposited onto a surface of the base material by the evaporation deposition. The protection layer has the waterproof and ultraviolet protection function. The material of the display area protection layer 8 may be polyurethane, acrylic resin, epoxy resin and natural polymer etc., and the display area protection layer 8 is used to protect the display plasma 3 of the display area, and play a role of lightproof and insulation.

The IC module 11 and a flexible circuit board 12 are provided on one side of the spacer frame 6. The IC module 11 and the flexible circuit board 12 are adhered to the pixel electrode 7 by an electrically conductive adhesive tape. The IC module 11, the flexible circuit board 12 and the electrically conductive adhesive tape are fixed and sealed on the pixel electrode 5 by RTV silicone 9.

The display plasma 3 has a thickness of 2-300 microns, preferably 8-20 microns. The electrophoretic fluid in the display plasma 3 has a viscosity of 100-100000 cP, preferably 1000-10000 cP.

Supporting microspheres 4 are provided in the spacer frame 6 and the display plasma 3, or according to the application of the display module, the supporting microballoons 4 may not be required. The supporting microspheres 4 are pre-coated on the lightproof insulating adhesive layer 5 on the surface of the pixel electrodes 7. The material of the supporting microspheres 4 includes resin microspheres and glass microspheres. The supporting microspheres 4 have a diameter of 2-60 μm, preferably 5-30 μm.

A method for manufacturing a display plasma module according to an embodiment of the present invention, characterized in that the method includes the following steps:

step 1: placing a pixel electrode 7 pre-printed with a lightproof insulating adhesive layer 5 on an adhesive dispensing platform, wherein supporting microspheres 4 may be pre-coated on the lightproof insulating adhesive layer 5 on the surface of the pixel electrode 7;

step 2: dropping a frame sealing adhesive on the pixel electrode 7 by an adhesive dispenser to form a spacer frame 6, wherein a material of the frame sealing adhesive includes epoxy resin, acrylic resin, and polyurethane resin etc., and the curing method of the frame sealing adhesive may be photo curing, heat curing, and moisture curing etc., and the photo curing is preferred; the material of the frame sealing adhesive may include supporting microspheres 4, or may not include supporting microspheres 4; the material of the supporting microspheres 4 may be resin microspheres and glass microspheres etc., and the resin microspheres are preferred, especially for the product of the Micropearl microsphere series from Japan SEKISUI CHEMICAL; the spacer frame 6 has a width of 2-300 microns, preferably 50-200 microns, and the spacer frame 6 has a height of 5-150 microns, preferably 15-60 microns;

step 3: printing the plasma 3 in the spacer frame 6 by the silk-screen printing equipment, wherein the display plasma 3 is applied to the surface of the pixel electrode 7 or the transparent electrode 1 by screen printing, coating, printing, adhesive dispensing, or the like; preferably, the applying mode includes silk-screen printing, intaglio printing, and slot die coating;

step 4: coating a conductive silver paste 10 in the spacer frame 6, wherein the conductive silver paste 10 may also be replaced by conductive golden beads;

step 5: laminating the transparent electrode 1 with the electrically conductive layer 2 and the display area protection layer 8 onto the entire spacer frame 6; and performing a cured; in this case, the conductive silver paste 10 is electrically connected to the pixel electrode 7, and the conductive electricity layer 2 is electrically connected to the transparent electrode 1;

step 6: trimming off a part of the transparent electrode 1 and the display area protection layer 8 by a glass cutting machine to expose a predetermined position for binding the IC module 11 and the flexible circuit board 12 on the pixel electrode 5;

step 7: configuring the IC module 11 and the flexible circuit board 12 on the edge of the pixel electrode 5 by the COG process;

step 8: fixing and sealing the IC module 11 and the flexible circuit board 12 in the RTV silicone 9 by the RTV silicone printing process, to complete the manufacture of the electronic ink display screen.

The display plasma 3 of the present invention includes at least two kinds of electrophoretic particles having different optical properties, which are used for displaying black and white, single color, double colors, multiple colors and true color etc. Meanwhile, the display plasma 3 may include fluorescent material. The fluorescent material includes an inorganic fluorescent material and an organic fluorescent material. The inorganic fluorescent material includes a rare earth fluorescent material and a metal sulfide etc. The organic fluorescent material includes a small molecule fluorescent material and a macromolecule fluorescent material etc.

The display plasma module of the present invention directly uses the display plasma 3 without traditional microstructure such as a microcapsule or a micro-cup. The basic structure of the present invention includes a transparent electrode 1, a display plasma 3, a pixel electrode 7, and driving peripherals, which has a simplified production process, a single display structure, a uniform and controllable thickness of the display layer, and a good display effect. In the module structure of the present invention, the microstructure such as the traditional microcapsule and the micro-cup is removed, so that the production efficiency and the yield are improved, and the display performance and the service life are also improved.

The present invention and embodiments thereof are described above. The above description is nonrestrictive. The structure shown in the drawings is merely one embodiment of the present invention, and the actual structure is not limited thereto. In short, if a person of ordinary skill in the art is inspired by the present invention and designs a structure, a method and an embodiment similar to this technical solution without creative efforts and departing from the inventive concept of the present invention, these derivatives should be considered as falling within the scope of the present invention.

What is claimed is:

1. A display plasma module comprising:
   a pixel electrode;
   a transparent electrode located above the pixel electrode;
   a display plasma provided between the pixel electrode and the transparent electrode; and
   a spacer frame located around the display plasma,
   wherein the spacer frame and the display plasma comprise supporting microspheres, wherein the display plasma includes electrophoretic particles surrounding on the outside of the supporting microspheres, wherein the display plasma with said electrophoretic particles forms a display plasma layer configured to emit light and wherein the spacer frame encloses the display plasma layer around a periphery of the display plasma layer.

2. The display plasma module according to claim 1, wherein the display plasma and the pixel electrode, the spacer frame and the pixel electrode are adhered by a lightproof insulating adhesive layer.

3. The display plasma module according to claim 1, wherein
   an electrically conductive layer is provided between the display plasma and the transparent electrode, and the electrically conductive layer is provided between the spacer frame and the transparent electrode; and
   a display area protection layer is provided between the spacer frame and the electrically conductive layer, and the display area protection layer is provided between an edge area of the display plasma and the electrically conductive layer.

4. The display plasma module according to claim 3, wherein a material of the display area protection layer comprises polyurethane, acrylic resin, epoxy resin or natural polymer.

5. The display plasma module according to claim 1, wherein
    an IC module and a flexible circuit board are provided on one side of the spacer frame;
    the IC module and the flexible circuit board are adhered to the pixel electrode by an electrically conductive adhesive tape; and
    an edge of the IC module, the flexible circuit board, and the electrically conductive adhesive tape are fixed and sealed on the pixel electrode by an RTV silicone.

6. The display plasma module according to claim 1, wherein the electrophoretic particles comprises at least two kinds of electrophoretic particles having different photoelectric properties, and the display plasma has a thickness of 2-300 microns.

7. The display plasma module according to claim 1, wherein an electrophoretic fluid in the display plasma has a viscosity of 100-100000 cP.

8. The display plasma module according to claim 1, wherein
    a material of the supporting microspheres comprises resin microspheres and glass microspheres; and
    the supporting microspheres have a diameter of 2-60 microns.

9. A method for manufacturing a display plasma module, comprising the following steps: step 1: placing a pixel electrode pre-printed with a lightproof insulating adhesive layer on an adhesive dispensing platform, wherein supporting microspheres are pre-coated on the lightproof insulating adhesive layer on a surface of the pixel electrode; step 2: dropping a frame sealing adhesive on the pixel electrode by an adhesive dispenser to form a spacer frame; step 3: printing a display plasma in the spacer frame by silk-screen printing equipment; step 4: coating a conductive silver paste in the spacer frame; step 5: laminating a transparent electrode with an electrically conductive layer and a display area protection layer on an entirety of the spacer frame, and performing a curing; step 6: trimming off a part of the transparent electrode and the display area protection layer by a glass cutting machine to expose a predetermined position for binding an integrated circuit (IC) module on the pixel electrode; step 7: configuring the IC module and a flexible circuit board on an edge of the pixel electrode by a chip-on-glass (COG) process; step 8: fixing and sealing the IC module and the flexible circuit board in an RTV silicone by an RTV silicone printing process, thereby completing a manufacture of the display plasma module such that the transparent electrode is located above the pixel electrode, the display plasma is between the pixel electrode and the transparent electrode, the spacer frame is located around the display plasma, the spacer frame and the display plasma comprise the supporting microspheres, the display plasma includes electrophoretic particles surrounding on the outside of the supporting microspheres, the display plasma with the electrophoretic particles forms a display plasma layer configured to emit light and the spacer frame encloses the display plasma layer around a periphery of the display plasma layer.

10. The display plasma module according to claim 1, wherein the display plasma further comprises a fluorescent material, and wherein the fluorescent material includes an inorganic fluorescent material and an organic fluorescent material; the inorganic fluorescent material includes a rare earth fluorescent material and a metal sulfide, and the organic fluorescent material includes a small molecule fluorescent material and a macromolecule fluorescent material.

11. The display plasma module according to claim 1, wherein a base material of the pixel electrode is plastic comprising at least one of Polyimide (PI), Polyethylene Naphthalate (PEN), and Polyethylene Terephthalate (PET).

12. The display plasma module according to claim 1, wherein the pixel electrode includes a segment code and a dot matrix.

13. The display plasma module according to claim 5, wherein the display plasma includes a plurality of white particles and a plurality of black particles; the black particles and the white particles are driven by the IC module to make the display screen display black and white color under different electric fields.

* * * * *